(No Model.)

J. ROYSE.
ANT TRAP.

No. 473,965.  Patented May 3, 1892.

Witnesses
Joseph C. Stack
H. J. Riley

Inventor
John Royse
By his Attorneys,
C. A. Snow & Co.

UNITED STATES PATENT OFFICE.

JOHN ROYSE, OF BONHAM, TEXAS.

ANT-TRAP.

SPECIFICATION forming part of Letters Patent No. 473,965, dated May 3, 1892.

Application filed January 18, 1892. Serial No. 418,468. (No model.)

*To all whom it may concern:*

Be it known that I, JOHN ROYSE, a citizen of the United States, residing at Bonham, in the county of Fannin and State of Texas, have invented a new and useful Ant-Trap, of which the following is a specification.

The invention relates to improvements in ant-traps.

The object of the present invention is to provide a simple and inexpensive ant-trap which will readily capture ants, and which will prevent their escape, and from which the captured ant may be readily removed.

The invention consists in the construction and novel combination and arrangement of parts, hereinafter fully described, illustrated in the accompanying drawings, and pointed out in the claim hereto appended.

Figure 1:
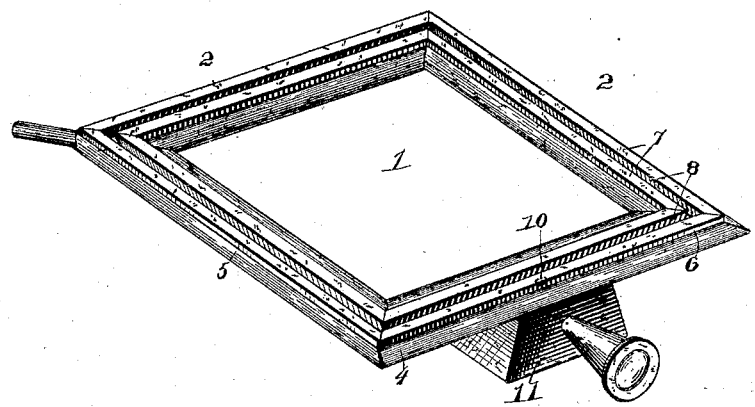
Figure 2:
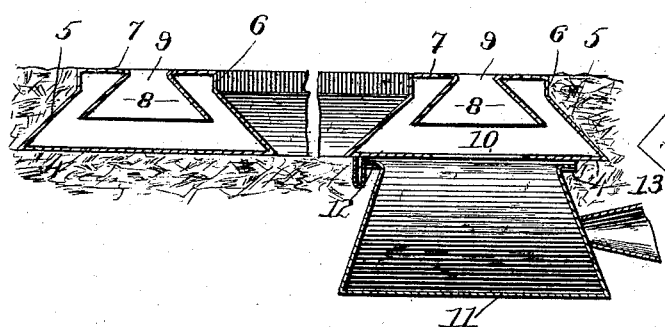
Figure 3:
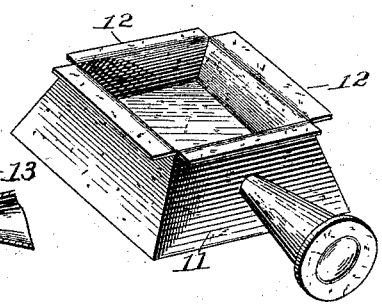

In the drawings, Figure 1 is a perspective view of an ant-trap constructed in accordance with this invention. Fig. 2 is a vertical sectional view. Fig. 3 is a detail perspective view of the removable receptacle.

Like numerals of reference indicate corresponding parts in all the figures of the drawings.

1 designates an ant-trap, which is rectangular and composed of four sides 2, and which is adapted to encompass an ant-hill and have its upper edges arranged on a level with the ground. Each side 2 is preferably constructed of a single piece of sheet metal, which is composed of a bottom 4, inclined walls 5, which are provided at their tops with vertical portions 6 and inwardly-extending horizontal portions 7, and inclined flanges 8, depending from the adjacent edges of the horizontal portions 7 to prevent the escape of ants. The inwardly-extending horizontal portions 7 form a narrow mouth or opening 9, in which ants crawl and fall upon the bottom floor. The horizontal portions 7 are arranged on the level with the ground, and the earth is banked around the track to take advantage of the habits of ants, which do not like to climb but which prefer to enter dark crevices. One of these sides 2 is provided in its bottom with an opening 10, beneath which is arranged a removable receptacle 11, having tapering sides and having the shape of the frustum of a pyramid and provided at its upper edges with flanges 12, adapted to engage ways 13 of the trap. The inclined sides of the receptacle prevent the ants crawling upward and escaping, and the front of the receptacle is provided with a handle. The ants after entering the trap will endeavor to escape by means of the opening 10 and will enter the receptacle, which may be readily removed to destroy the ant by burning, scalding, or the like.

In order to remove those ants which do not enter the receptacle, a discharge-spout 14 is provided at one corner of the ant-trap. Water may be poured through the mouth or opening 9 and discharged through the spout 14, thereby cleaning the trap and removing all ants.

It will be seen that the trap is simple and comparatively inexpensive in construction, that it is especially adapted to the habits of the ants, that ants may be readily captured, and when once captured cannot escape, and that they may be readily removed from the trap and destroyed.

What I claim is—

An ant-trap comprising the sides 2, adapted to encompass an ant-hill and composed of a bottom 4, inclined walls 5, and horizontal top portions 7, having depending inclined flanges, one of the sides 2 having an opening in its bottom and provided with ways arranged on opposite sides of the opening, a removable receptacle provided with flanges arranged in said ways and having inwardly-inclined walls, and a discharge-tube arranged at one corner of the trap, substantially as described.

In testimony that I claim the foregoing as my own I have hereto affixed my signature in the presence of two witnesses.

JOHN ROYSE.

Witnesses:
NICHOLAS M. BALLARD,
WALLACE W. RUCKER.